United States Patent [19]

Kroft

[11] 4,057,125

[45] Nov. 8, 1977

[54] BUMPER-MOUNTED TRUCK SERVICING PLATFORM

[76] Inventor: Frederick J. Kroft, R.F.D. No. 1, Box 90, Medaryville, Ind. 47957

[21] Appl. No.: 745,787

[22] Filed: Nov. 29, 1976

[51] Int. Cl.² .............................................. B60R 3/00
[52] U.S. Cl. ..................................... 182/91; 182/92; 182/206; 280/166
[58] Field of Search .................... 182/150, 92, 91, 90, 182/97, 206, 54, 53, 55; 280/163, 165, 166; 248/240, 240.2, 214; 108/44, 47, 48

[56] References Cited

U.S. PATENT DOCUMENTS

| | | | |
|---|---|---|---|
| 2,624,058 | 1/1953 | Kudrna | 182/62 |
| 2,687,922 | 8/1954 | Shea | 182/55 |
| 2,746,664 | 5/1956 | Strmic | 248/240 |
| 2,849,257 | 8/1958 | Woyton | 182/55 |
| 3,159,242 | 12/1964 | James | 182/92 |

Primary Examiner—Reinaldo P. Machado
Attorney, Agent, or Firm—Burton, Parker & Schramm

[57] ABSTRACT

A service platform for removable mounting on a vehicle bumper includes a generally planar platform member with means for engaging the bumper for supporting and locking the platform thereto in a substantially horizontal plane and for permitting unlocking and removal from the bumper when the platform is moved to a substantially vertical plane.

2 Claims, 4 Drawing Figures

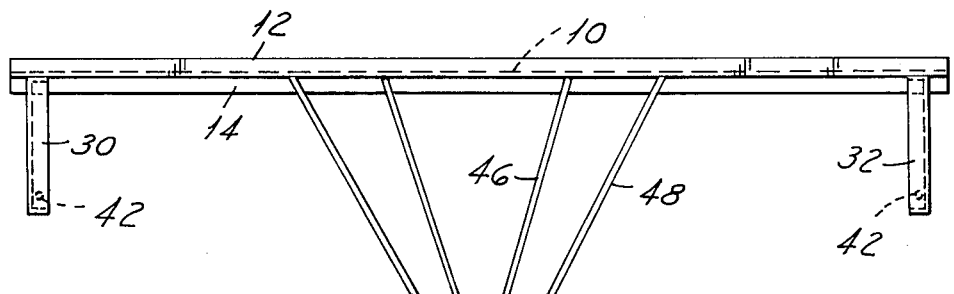
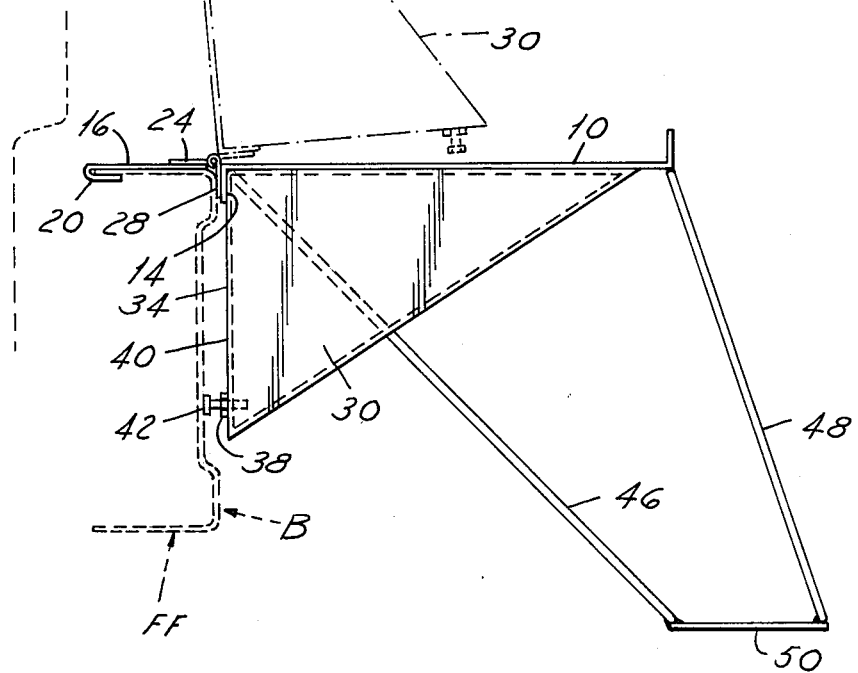

BUMPER-MOUNTED TRUCK SERVICING PLATFORM

FIELD OF INVENTION

This invention relates to a vehicle service platform which may be removably secured to a vehicle bumper, such as the front bumper of a truck, to enable the mechanic to stand on the platform to facilitate servicing of the engine of the truck.

BACKGROUND OF THE INVENTION

Service platforms for removable mounting on vehicles to facilitate servicing of the engine are known in the art as represented by the disclosures of the following U.S. Pat. Nos.:2,738,678; 3,590,950; 3,627,350.

In addition, the prior art also discloses a platform structure to be attached to refrigerated or other railway freight cars, U.S. Pat. No. 2,624,058, and a camp table for removable mounting on a vehicle bumper, U.S. Pat. No. 2,718,445.

Of the aforementioned prior art disclosures, the service platforms of U.S. Pat. Nos. 2,378,678 and 3,590,950 are intended to be mounted on the vehicle wheel by engaging over the top of the wheel and U.S. Pat. No. 3,627,350 intends to have the platform bolted to the vehicle bumper. In the case of U.S. Pat. No. 2,624,058 it does not lend itself to mounting on a vehicle bumper and in the case of U.S. Pat. No. 2,718,445 the structure is intended as a camp table and it is questionable whether it would be strong enough to support the weight of a mechanic and in addition could easily become detached accidentally from the bumper with possible injury to a party attempting to stand on it.

In the servicing of trucks and other large vehicles where the engine is at some height above the ground, it is desirable that the service garage have some means to enable the mechanic to stand on a platform structure at some distance above the ground to enable ready access to the engine compartment. I have found that for many trucks access to the engine can be easily obtained if the mechanic is able to stand in front of the truck engine compartment with his feet essentially at the level of the top of the front bumper. The service platform must be readily mountable on the bumper and removable therefrom in order to make such a device attractive to automotive service garages. In addition, it must be sturdy enough to enable firm support for the mechanic, or possibly two mechanics and in the case of relatively high bumpers should desirably have a step which will enable the mechanic to climb easily up to the platform. In addition, the platform must be quickly mountable and removable from the bumper and when in operative position must be securely locked thereto so that inadvertent bumping or jiggling of the bumper or platform will not cause the same to become detached.

SUMMARY OF THE INVENTION

I have disclosed herein a service platform which may be readily mounted and removed from a vehicle bumper such as the front bumper of a truck. The platform comprises a generally planar platform member having means at one margin for engaging over the upper edge of the bumper to connect the platform thereto and also having means adjacent such marginal edge for engaging the bumper to support the platform member in a substantially horizontal plane and at the same time trap the upper edge of the bumper to effectively lock it to the platform and prevent unhooking of the platform member from the bumper when the platform is in operative position. In a preferred embodiment the platform member has hingedly connected hook-like members which engage over an inwardly turned upper flange of the bumper and such hook members can be engaged over the flange when the platform member is disposed in an upwardly extending substantially vertical position. Following the hook engagement the platform is swung down to its operative generally horizontal position and support means or brackets on the underside of the platform engage the frontal face of the bumper locking the hook members to the inwardly turned upper flange and preventing accidental or inadvertent dislodgement of the platform from the bumper. In addition, the platform is provided with a step disposed beneath the front edge to enable ready climbing to the platform by the mechanic.

BRIEF DESCRIPTION OF THE DRAWINGS

FIG. 3 is a front elevation of the service platform; and

FIG. 4 is a side elevation showing in solid outline the service platform in operative position mounted on the front bumper of the truck and in phantom outline the position of the service platform for mounting or removing the same from the bumper.

BRIEF DESCRIPTION OF PREFERRED EMBODIMENT

Figure 1:
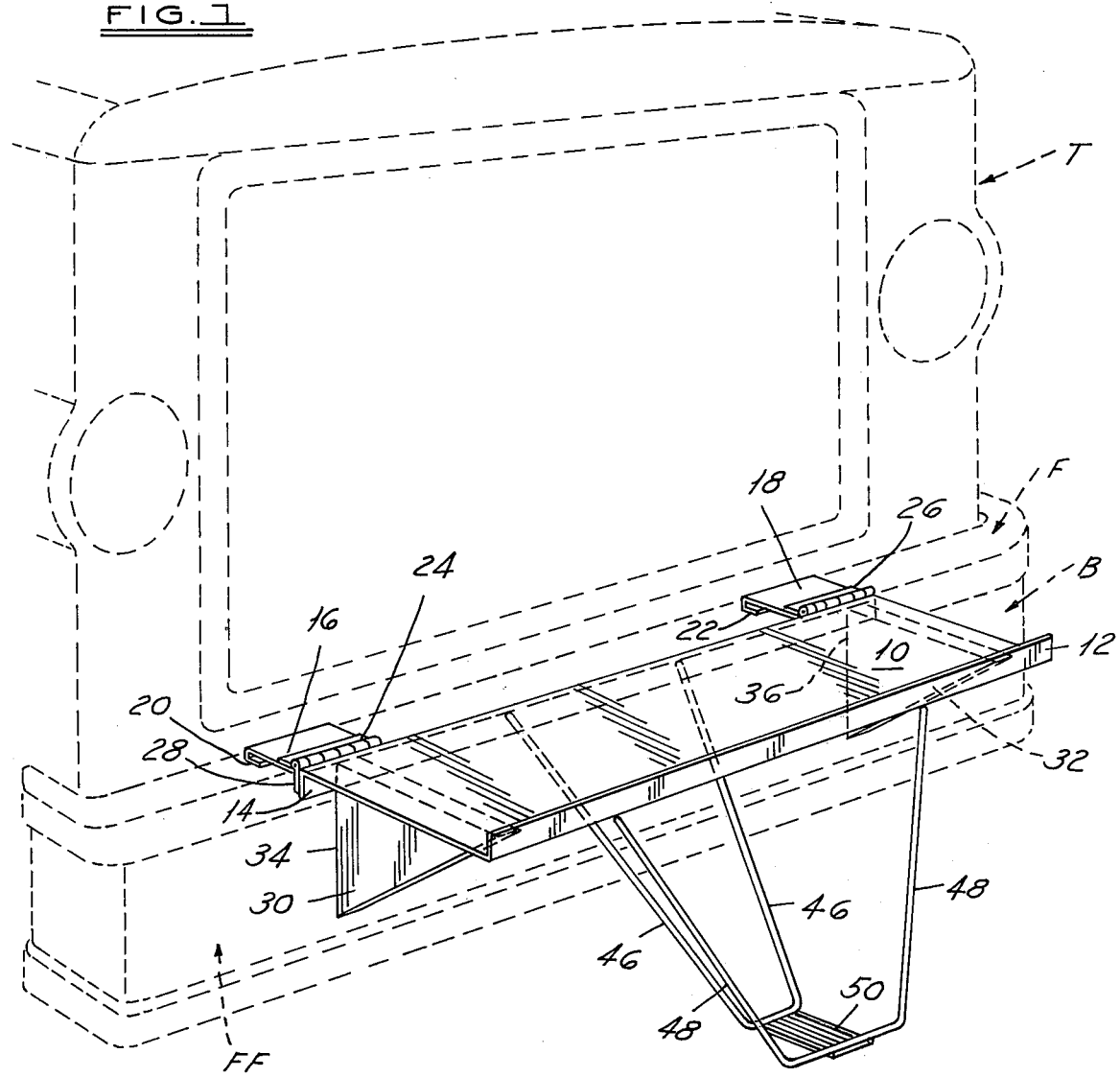
FIG. 1 is a perspective frontal view of my service platform shown mounted on the front bumper of a truck, the truck being shown in phantom outline.
Figure 2:
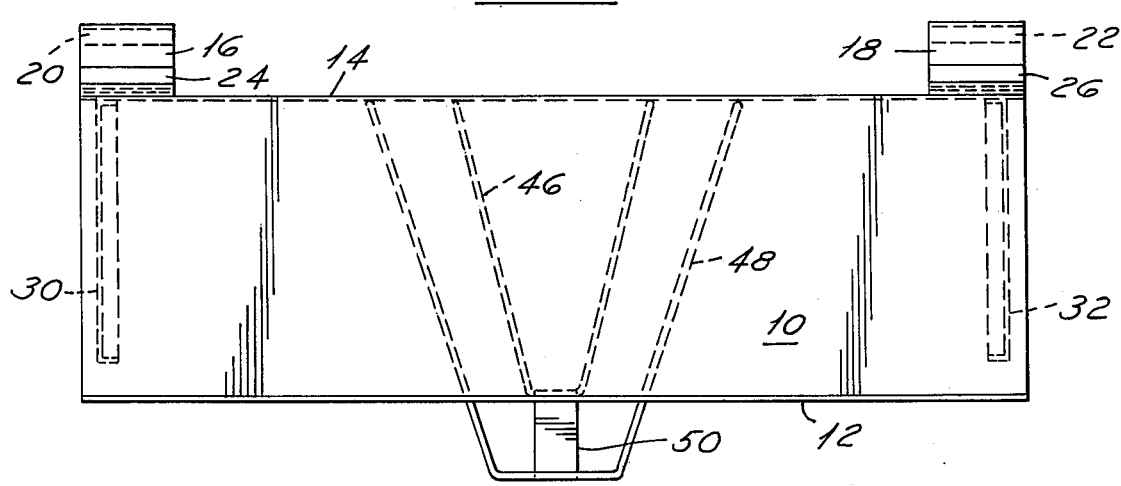
FIG. 2 is a plan view of the service platform.

In FIG. 1 my service platform is shown as comprising a generally planar platform member 10 having opposite front and rear marginal edges respectively 12 and 14, the former being upturned and the latter downturned flanges which reinforce the platform member. The platform is intended to be mounted on vehicles, such as the truck T having a bumper B the latter having an inwardly turned upper flange F and a frontal face FF.

To removably secure the platform member 10 to the bumper B, such as the front bumper of a truck, means are provided at the rear marginal edge 14 for engaging over the upper edge of the bumper. To support the platform member 10 in a substantially horizontal or operative position further means are provided for overlying and engaging the frontal face FF of the bumper. Such means comprise in the first instance hook means in the form of a pair of hook-shaped members 16 and 18 having distal ends 20 and 22 of hook-shaped configuration for embracing the inwardly turned flange F at the upper edge of the bumper. The proximal ends of the hook members 16 and 18 are hingedly connected to the rear marginal edge 14 of the platform member. For this purpose proximal ends of the members 16 and 18 are connected, as by welding, to hinged leaves 24 and 26. Cooperating hinge leaves, one of which is shown at 28 in FIGS. 1 and 4, are connected in conventional fashion to the leaves 24 and 26 and are rigidly secured as by welding to the rearward marginal edge 14 of the platform member 10.

To support the platform member in operative position on the bumper further means in the form of a pair of triangular supporting brackets 30 and 32 are rigidly connected to the underside of the platform, as by welding. These brackets have a rearward edge 34 and 36 adapted to be juxtaposed to the frontal face FF of the bumper when the platform member is in operative position as shown in FIG. 1 and in solid outline in FIG. 4 and serve to support the platform member in such position. In order to level the platform each of the brackets is provided with leveling means which may be in the form of threaded adjustment screws including a threaded element 38 welded or otherwise secured to a rear flange 40 of each bracket with a bolt threaded thereinto and having a head which will abut the frontal face FF of the bumper. By threaded adjustment of the bolt inwardly or outwardly the platform member 10 may be leveled. A step may be provided to facilitate climbing up onto the platform. The step may comprise a pair of rod-like brackets 46 and 48 secured as by welding at their upper ends to the underside of the platform member and provided with a step member 50 welded to the rod-like members at their lower ends, with the step 50 disposed beneath and somewhat in front of the platform member.

When the platform is in its operative position shown in FIG. 1 and in solid outline in FIG. 4, the hooks 20 and 22 embrace the inwardly extending upper edge of the bumper. The downturned flange 14 at the rear edge of the platform member, the hinge leaves 28 and the rear edges of brackets 30 and 32 overlie the frontal face FF of the bumper as shown in FIG. 4 effectively trapping the upper edge of the bumper, or locking it, within the hook members 16 and 18, against inadvertent dislodgement.

In order to mount the service platform on a vehicle bumper, the platform member 10 is disposed in a substantially vertical position such as shown in phantom outline in FIG. 4 and the hook members 16 and 18 are then engaged over the rear edge of the inwardly turned upper flange F of the bumper. The platform member is then swung clockwise as shown in FIG. 4 to the solid outline position and the adjusting means 42 are rotated to level the platform member. The service platform is now ready for use and securely locked on the bumper against inadvertent dislodgement. Removal may only be accomplished by reversing the procedure.

What is claimed is:

1. A service platform for removable mounting on a vehicle bumper disposed adjacent a vertical wall portion of the vehicle, the bumper having an upper flange extending horizontally toward such wall portion and a front vertical flange providing a frontal face, comprising, in combination:

a generally planar rectangularly shaped platform member;

a pair of hooks each having a planar first portion adapted to overlie the upper edge of the bumper and extend completely thereacross, and a planar second portion connected to the first portion at an edge thereof and underlying the first portion and disposed in parallel space relation therefrom a distance only slightly exceeding the thickness of the upper flange of the bumper, whereby said hook must be slidably inserted or removed over the inner edge of the top flange in a substantially horizontal direction, and wherein the free length of the planar second portion of each hook is less than the horizontal distance between the inner edge of the bumper upper flange and the adjacent vertical wall of the vehicle but of sufficiently great length so that said hook cannot be pivoted upwardly when operatively embracing such flange;

said hooks being spaced apart along a longer side of the platform and pivotally connected thereto at the edge of the platform;

said platform being swingable relative to the hooks to a substantially vertical position while the hooks are in a horizontal position and shiftable toward the vertical wall of the vehicle to dispose said second hook portion between the inner edge of the bumper upper flange and the vertical wall of the vehicle and said platform shiftable away from said vertical wall of the vehicle to cause said hooks to slidably embrace the bumper upper flange;

said platform including a pair of braces disposed on the underside thereof in laterally spaced apart relation for engaging the frontal face of the bumper when the platform is in a horizontal position with the hooks embracing the bumper upper flange;

said hinge connection between the hooks and platform being disposed at the intersection of the upper flange and vertical flange of the bumper when the platform is mounted on the bumper whereby the weight of the platform and a load carried thereby is taken by the first hook portion in flat face-to-face engagement with the bumper upper flange; and a step connected to the platform and disposed spaced below and somewhat forwardly of the same.

2. The invention defined by claim 1 wherein adjustable levelling means are mounted on the braces for engaging the frontal face of the bumper to level the platform.

* * * * *